United States Patent
Hildenbrand et al.

(10) Patent No.: US 11,474,852 B2
(45) Date of Patent: Oct. 18, 2022

(54) RESETTING PERSISTENT BALLOON MEMORY FOR FRAGMENTATION REDUCTION

(71) Applicant: Red Hat, Inc., Raleigh, NC (US)

(72) Inventors: David Hildenbrand, Grasbrunn (DE); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 132 days.

(21) Appl. No.: 16/875,177

(22) Filed: May 15, 2020

(65) Prior Publication Data

US 2020/0278878 A1 Sep. 3, 2020

Related U.S. Application Data

(63) Continuation of application No. 15/829,020, filed on Dec. 1, 2017, now Pat. No. 10,664,300.

(51) Int. Cl.
*G06F 12/00* (2006.01)
*G06F 12/02* (2006.01)
*G06F 9/455* (2018.01)

(52) U.S. Cl.
CPC ........ *G06F 9/45558* (2013.01); *G06F 12/023* (2013.01); *G06F 2009/45583* (2013.01); *G06F 2212/1044* (2013.01); *G06F 2212/657* (2013.01)

(58) Field of Classification Search
CPC .............. G06F 12/023; G06F 9/45558; G06F 2009/45583
See application file for complete search history.

(56) References Cited

U.S. PATENT DOCUMENTS

| | | | |
|---|---|---|---|
| 7,433,951 B1 | 10/2008 | Waldspurger | |
| 9,183,676 B2 | 11/2015 | McCulloch et al. | |
| 9,335,943 B2 | 5/2016 | Sahita et al. | |
| 9,459,900 B2 | 10/2016 | Tsirkin | |
| 9,547,600 B2 | 1/2017 | Tarasuk-Levin et al. | |
| 9,798,482 B1 | 10/2017 | Tsirkin et al. | |
| 2010/0250868 A1 | 9/2010 | Oshins | |

(Continued)

FOREIGN PATENT DOCUMENTS

WO 2013/082598 A1 6/2013

OTHER PUBLICATIONS

George Dunlap; Ballooning, rebooting, and the feature you've never heard of; https://blog.xenproject.org/2014/02/14/ballooning-rebooting-and-the-feature-youve-never-heard-of/; published 2014; retrieved Aug. 31, 2017 (5 pages).

(Continued)

*Primary Examiner* — Baboucarr Faal
(74) *Attorney, Agent, or Firm* — K&L Gates LLP

(57) ABSTRACT

A balloon memory fragmentation reduction system includes a memory, at least one processor in communication with the memory, a guest operating system (OS) including a device driver, and a hypervisor executing on the at least one processor. The hypervisor is configured to record an amount of memory allocated by the device driver of the guest OS, locate a contiguous region of guest memory addresses according to the amount of memory allocated by the device driver, reserve the contiguous region of guest memory addresses, and notify the guest OS that the contiguous region of guest memory addresses is reserved.

20 Claims, 6 Drawing Sheets

(56) References Cited

U.S. PATENT DOCUMENTS

| | | | |
|---|---|---|---|
| 2013/0339568 A1* | 12/2013 | Corrie | G06F 9/45558 |
| | | | 711/6 |
| 2014/0258670 A1 | 9/2014 | Venkatasubramanian et al. | |
| 2015/0039838 A1 | 2/2015 | Tarasuk-Levin et al. | |
| 2016/0378519 A1 | 12/2016 | Gaurav et al. | |
| 2018/0074863 A1 | 3/2018 | Kung et al. | |

OTHER PUBLICATIONS

Gandhi, et al; Efficient Memory Virtualization; 1. http://research.cs.wisc.edu/multifacet/papers/micro14_virtualization.pdf; retrieved Aug. 31, 2017 (12 pages).

* cited by examiner

RESETTING PERSISTENT BALLOON MEMORY FOR FRAGMENTATION REDUCTION

CROSS REFERENCES TO RELATED APPLICATIONS

This application is a continuation of and claims priority to and the benefit of U.S. patent application Ser. No. 15/829,020, filed on Dec. 1, 2017, the entire content of which is hereby incorporated by reference.

BACKGROUND

Computer systems may run virtual machines with memory allocated by a hypervisor. With memory overcommit, virtual machines and their associated guest operating systems may "think" that they have access to more memory than is actually assigned by the hypervisor. For example, memory overcommit (or overcommitment) is a hypervisor feature that allows a virtual machine, in effect, to use more memory space than the physical host has available. To achieve memory overcommit, memory may be reallocated by adding and/or removing memory from other virtual machines as physical memory permits.

SUMMARY

The present disclosure provides new and innovative systems and methods for resetting persistent balloon memory for fragmentation reduction. In an example, a system includes a memory, at least one processor in communication with the memory, a guest operating system (OS) including a device driver, and a hypervisor executing on the at least one processor. The hypervisor is configured to record an amount of memory allocated by the device driver of the guest OS, locate a contiguous region of guest memory addresses according to the amount of memory allocated by the device driver, reserve the contiguous region of guest memory addresses, and notify the guest OS that the contiguous region of guest memory addresses is reserved.

In an example, a method includes recording, by the hypervisor, an amount of memory allocated by a device driver of a guest OS. Additionally, the hypervisor locates a contiguous region of guest memory addresses according to the amount of memory allocated by the device driver, reserves the contiguous region of memory addresses, and notifies the guest OS that the contiguous region of memory addresses is reserved.

In an example, a non-transitory machine readable medium stores code, which when executed by a processor, is configured to record an amount of memory allocated by a device driver of a guest OS, locate a contiguous region of guest memory addresses according to the amount of memory allocated by the device driver, reserve the contiguous region of memory addresses, and notify the guest OS that the contiguous region of memory addresses is reserved.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
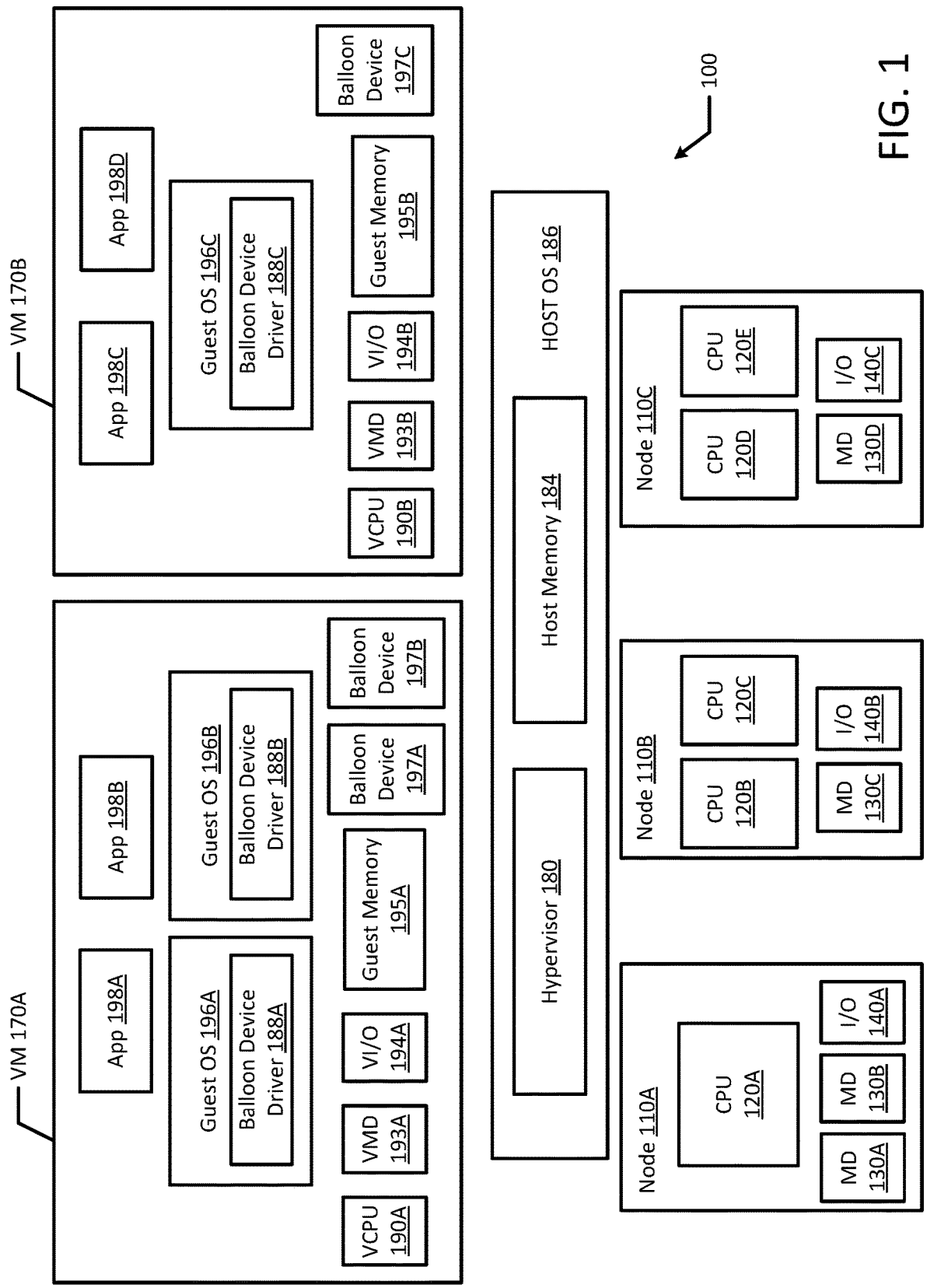
FIG. 1 illustrates a block diagram of an example computing system according to an example embodiment of the present disclosure.

Techniques are disclosed for resetting persistent balloon memory for fragmentation reduction. Often times, with memory overcommit, guests (e.g., guest operating systems) may "think" that their associated virtual machines have more memory than the amount of memory assigned by the hypervisor. Currently, techniques of memory overcommit are implemented by a balloon driver that takes guest memory and hands that memory back to the host, thereby preventing the guest from accessing the memory and allowing the memory to be reallocated by the hypervisor. However, for the balloon driver implementation to work properly, the balloon driver often controls how memory is added and removed from a balloon device to prevent the hypervisor from adding too much memory back to the balloon, thereby causing the guest OS and/or related applications to lose stability and killing the applications. The balloon driver controls balloon inflation and deflation, which tends to cause memory fragmentation as ballooned memory pages are scattered in the guest memory. Additionally, with the balloon driver in control, the host typically is unable to combine the scattered memory pages to free a large memory page or allocate large pages of memory. Similarly, the guest is typically constrained and is unable to free more memory. When the device driver adds and/or removes memory to the balloon device (e.g., by inflating or deflating the balloon device) in conjunction with removing or allocating additional memory to the guest OS, the memory often becomes fragmented and memory pages used by the balloon device are scattered in guest memory. If the hypervisor attempts to reallocate unused memory to other virtual machines, there may not be contiguous regions of memory to allocate, thus compounding the problem and furthering the memory fragmentation, which may reduce system performance and in some cases reduce hardware utilization and/or virtual machine density. For example, memory fragmentation may cause applications or drivers to delay startup, slow down execution, or freeze, causing the guest OS to lose stability or crash thereby reducing system performance.

As described in the various example embodiments disclosed herein, to reduce memory fragmentation, the hypervisor records the amount of memory allocated by the device driver and at guest reset, and performs compaction. For example, according to the amount of memory usable by the device driver, the hypervisor locates a contiguous region(s) of guest memory addresses. Additionally, the balloon device driver queries usable memory from the balloon device and adds usable memory to the guest OS, leaving unusable memory untouched by the guest OS. For example, if the guest OS was using 4 GB of memory before resetting, and 5 GB of memory was inflated in a balloon device (e.g., 5 GB of unusable memory), then upon reset, the hypervisor may locate contiguous regions of guest memory addresses (e.g., a contiguous 5 GB block or region of unusable memory and a contiguous 4 GB block of usable memory). By locating the contiguous regions of memory, the hypervisor defragments the memory so the guest OS may restart with a contiguous 4 GB block of usable memory, for example, 4 GB of memory backed by 2×2 GB memory pages after defragmentation. The contiguous region(s) of reserved memory or unusable memory (e.g., a contiguous 5 GB block or region of memory) may be inflated in a balloon device and allocated to the guest OS as needed, for example, as a large 2 GB memory page, 5 GB memory page, etc. Thus, the various example embodiments disclosed herein advantageously prevent the guest from crashing by allowing the device driver to handle memory requests. Additionally, the techniques disclosed may be used to compact and defragment virtual machine memory, for example, balloon device memory that is persistent across a guest reset. By compacting or reorganizing memory at guest reset, the host is able to free large pages of memory to other processes and tasks (e.g., other virtual machines, housekeeping or maintenance) or allocate large memory pages to achieve an advantageously efficient virtual machine memory overcommit with balloon memory fragmentation reduction.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-C), and balloon device memory. Balloon device memory may be memory of one or more memory devices (130A-D) or balloon devices 197A-C (e.g., paravirtualized memory devices). In an example, balloon device memory may be persistent memory, which can be accessed using memory instructions or memory APIs after the end of a process.

Virtual machines 170A-B may include a guest OS, guest memory, a virtual CPU (VCPU), virtual memory devices (VMD), and virtual input/output devices (VI/O). For example, virtual machine 170A may include guest OS 196A-B, guest memory or virtual machine memory 195A, a virtual CPU 190A, a virtual memory devices 193A, a virtual input/output device 194A, and balloon device 197A-B. Guest OS 196A may include balloon driver 188A and Guest OS 196B may include balloon driver 188B. Virtual machine memory 195A may include one or more memory pages. Similarly, virtual machine 170B may include guest OS 196B, virtual machine memory 195B, a virtual CPU 190B, a virtual memory devices 193B, and virtual input/output device 194B, and balloon device 197C. Guest OS 196C may include balloon driver 188C. Virtual machine memory 195B may include one or more memory pages.

The computing system 100 may also include a hypervisor 180 and host memory 184. Hypervisor 180 may manage host memory 184 for the host operating system 186 as well as memory allocated to the virtual machines 170A-B and guest operating systems 196A-C such as guest memory or virtual machine memory 195A-B provided to guest OS 196A-C. Host memory 184 and virtual machine memory 195A-B may be divided into a plurality of memory pages that are managed by the hypervisor 180. Virtual machine memory 195A-B allocated to the guest OS 196A-C may be mapped from host memory 184 such that when a guest application 198A-D uses or accesses a memory page of virtual machine memory 195A-B, the guest application 198A-D is actually using or accessing host memory 184.

Hypervisor 180 may be configured to record an amount of memory allocated by the device driver (e.g., balloon device driver 188A-C of the guest OS (e.g., guest OS 196A-C) and locate a contiguous region of guest memory addresses according to the amount of memory allocated by the device drivers 188A-C. For example, the hypervisor 180 may record an amount of usable or deflated device memory and an amount of unusable or inflated device memory. Additionally, the hypervisor 180 may be configured to reserve the contiguous region of guest memory addresses and notify the guest OS (e.g., guest OS 196A-C) that the contiguous region of guest memory addresses is reserved. For example, hypervisor 180 may locate contiguous regions of guest physical memory addresses according to the amounts of usable (e.g., 2 GB of a possible 7 GB of balloon device memory) and unusable device memory (e.g., 5 GB of a possible 7 GB of balloon device memory). Hypervisor 180 may reserve the located contiguous regions of guest memory addresses upon guest reset in order to compact and defragment the 2 GB of usable memory and the 5 GB of unused guest memory as unusable balloon device memory. The hypervisor 180 may also be configured to notify the guest OS that the regions of memory are reserved, such that they are handled by the balloon device driver (e.g. balloon device drivers 188A-C). Hereinafter balloon device drivers 188A-C may be referred to more generally as device drivers 188A-C. For example, if device memory of balloon device 197A is exposed to guest OS 196A, the respective device driver (e.g., device driver 188A) of guest OS 196A may add or remove memory allocated to guest OS 196A by deflating and inflating a balloon device 197A. The hypervisor 180 may request the respective device driver 188A-C to add "usable" memory and remove "unused" memory from a respective guest OS 196A-B, however, the respective device drivers 188A-C may process the requests or a portion of the request to prevent the guest OS 196A-C from crashing. For example, the hypervisor 180 may request 3 GB, but the device driver may only inflate a balloon device to 2 GB instead of 3 GB to ensure that the guest OS has sufficient memory to execute tasks and run applications (e.g., Applications 198A-D).

As used herein, "usable" memory is memory that is usable or made available to the guest OS (e.g., guest OS 196A-B). For example, initialization memory is exposed to the guest OS as "usable" memory that the guest uses to initialize. Additionally, balloon device drivers 188A-C may add "usable" memory to the guest OS (e.g., guest OS 196A-B) by deflating balloon devices 197A-C and exposing the balloon device memory to the guest OS (e.g., guest OS 196A-B). Additionally, as used herein, "unused" memory is memory that is not being used by the guest OS (e.g., guest OS 196A-B). For example, "unused" memory may be "usable" memory that the guest OS no longer needs (e.g., due to a period of inactivity or decreased network traffic). In another example, "unused" memory may be balloon device memory that the guest OS may not use (and thus is "unused"

by the guest OS) because it is still part of the inflated balloon device and is not currently exposed to the guest OS (e.g., guest OS 196A-B).

Similarly, as used herein, "unusable" memory is memory that is currently not made available to the guest OS (e.g., guest OS 196A-C). For example, the memory of an inflated balloon device is "unusable" memory to the guest OS (e.g., guest OS 196A-C) because the memory is not exposed to the guest OS and thus the guest OS (e.g., guest OS 196A-C) is unable to use the memory.

In an example, a virtual machine 170A may execute a guest operating system 196A and run applications 198A-B which may utilize the underlying VCPU 190A, VMD 193A, and VI/O device 194A. One or more applications 198A-B may be running on a virtual machine 170A under the respective guest operating systems 196A-B. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B. Nodes 110A-C may be non-uniform memory access ("NUMA") nodes.

In an example, balloon memory may be located on balloon devices 197A-C. Each balloon device 197A-C may be associated with a memory region (e.g., a start address and an end address in the memory region). Additionally, the balloon devices 197A-C may be virtual devices. In an example, each balloon device 197A-C may be associated with a respective NUMA node (e.g., nodes 110A-C). For example, balloon device 197A may be associated with node 110A, balloon device 197B may be associated with node 110B, and balloon device 197C may be associated with node 110C.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
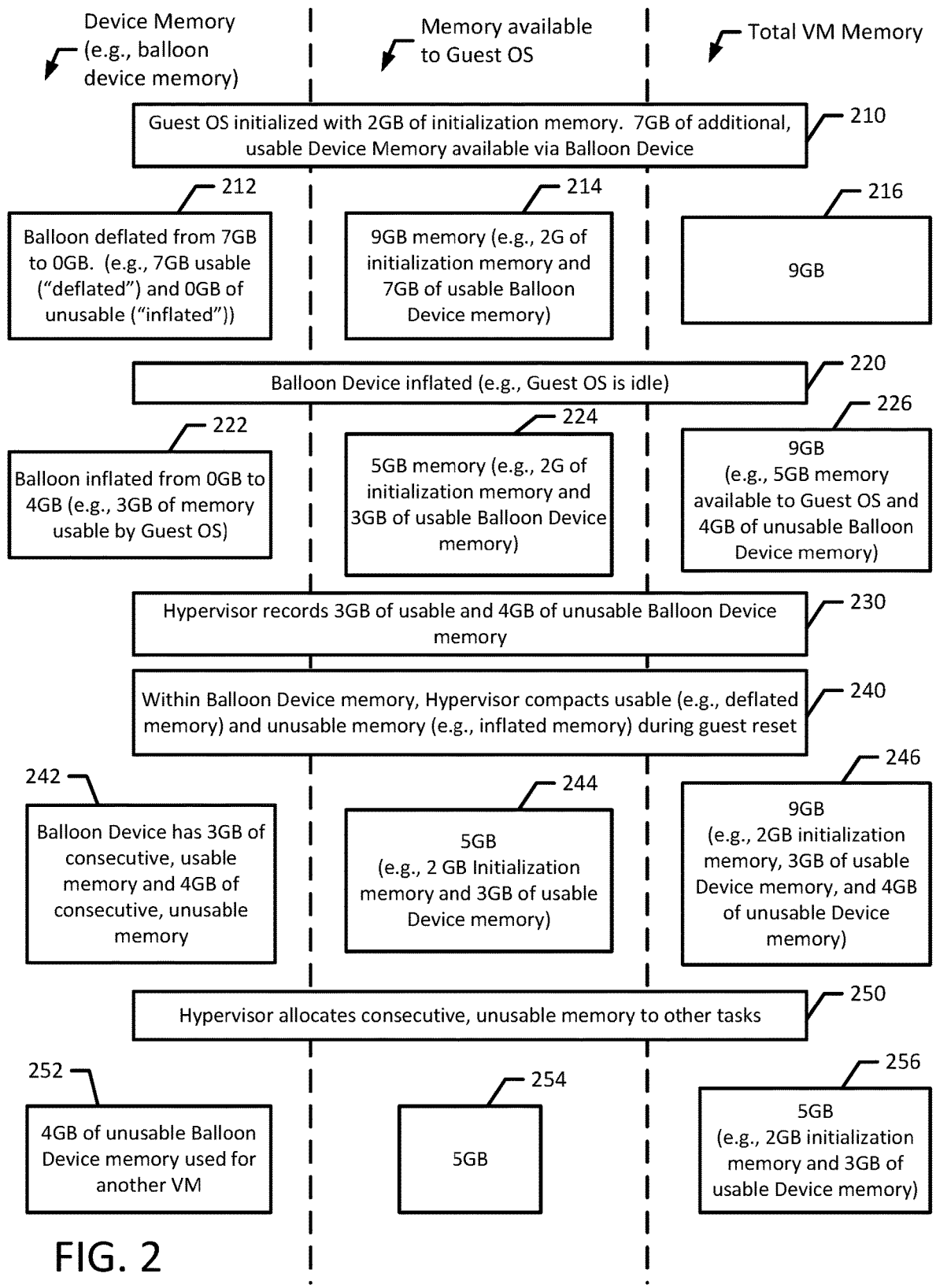
FIG. 2 illustrates a block diagram of resetting persistent balloon memory for fragmentation reduction according to an example embodiment of the present disclosure.

FIG. 2 illustrates a block diagram of resetting persistent balloon memory for fragmentation reduction. In a virtual machine (e.g., VM 170B), a device driver (e.g., device driver 188C, for example, a balloon device driver) may inflate and deflate device memory (e.g., balloon device memory) of a balloon device (e.g., balloon device 197C) in order to make more or less memory available to a guest OS (e.g., guest OS 196C). As illustrated in FIG. 2, guest OS 196C initializes with 2 GB of initialization memory and 7 GB of device memory usable by the guest OS 196C (block 210). For example, the balloon device 197C may have deflated from 7 GB of 0 GB (block 212) to allocate the 7 GB of balloon device memory to the guest OS 196C, giving the guest OS 196C a total of 9 GB of memory (e.g., 2 GB of initialization memory and 7 GB of usable balloon device memory) (block 214). The 9 GB of memory is the total amount of memory available to the virtual machine 170B (block 216). For example, the virtual machine 170B may be allocated enough memory (e.g., 2 GB) for the guest OS 196C to initialize, but typically not enough to execute additional applications (e.g., application 198C-D) or programs beyond initialization. As illustrated above, to provide additional memory to the virtual machine 170B and/or guest OS 196C, balloon device memory may be exposed to the virtual machine 170B.

The balloon device 197C may be inflated (block 220) during a period of inactivity or when guest OS 196C is idle. For example, the balloon device 197C may be inflated from 0 GB to 4 GB leaving 3 GB of balloon device memory usable by guest OS 196C (block 222), which leaves 5 GB of memory available to the guest OS 196C (e.g., 2 GB of initialization memory and 3 GB of usable balloon device memory) (block 224). There is still 9 GB of total memory available to virtual machine 170B, which includes the 5 GB of memory available to the guest OS 196C and the 4 GB of unusable memory inflated in the balloon device 197C (block 226). The hypervisor 180 may record the 4 GB of unusable, inflated balloon device memory and may also record the 3 GB of usable, deflated balloon device memory (block 230).

Within balloon device memory, the hypervisor 180 compacts available memory (e.g., 3 GB of usable memory that was used by guest OS 196C prior to reset) and unused memory (e.g., 4 GB of unusable memory inflated in balloon device 197C prior to reset) during guest reset (block 240). For example, during guest reset, the balloon device has a total of 7 GB of memory with 3 GB of consecutive, usable memory and 4 GB of consecutive, unusable memory (block 242). The guest OS 196C has 5 GB of available memory (block 244), for example, the guest OS 196C has 2 GB of initialization memory and 3 GB of usable memory from the balloon device 197C that guest OS 196C was using before compacting by the hypervisor. After compacting, the virtual machine has 9 GB of total memory (block 246) with 4 GB of consecutive, unusable memory reserved or inflated in the balloon device 197C and 5 GB of memory for the guest OS 196C (e.g., 2 GB of initialization memory and 3 GB of usable device memory). In an example, the 3 GB of usable balloon device memory is compacted such that the guest OS 196C operates with 3 GB of consecutive memory addresses (e.g., a contiguous memory region of balloon device memory).

Then, the hypervisor allocates the 4 GB of reserved memory (e.g., consecutive, unusable device memory) to other tasks (block 250). For example, 4 GB of the unusable balloon device memory may be used for another virtual machine (e.g., VM 170A) (block 252), leaving 5 GB of memory available to the guest OS 196C (block 254) and 5 GB of total memory available to VM 170B (e.g., 2 GB of initialization memory and 3 GB of usable device memory) (block 256). In another example, the 4 GB of memory may be reallocated to VM 170B as a large memory page(s).

Figure 3:
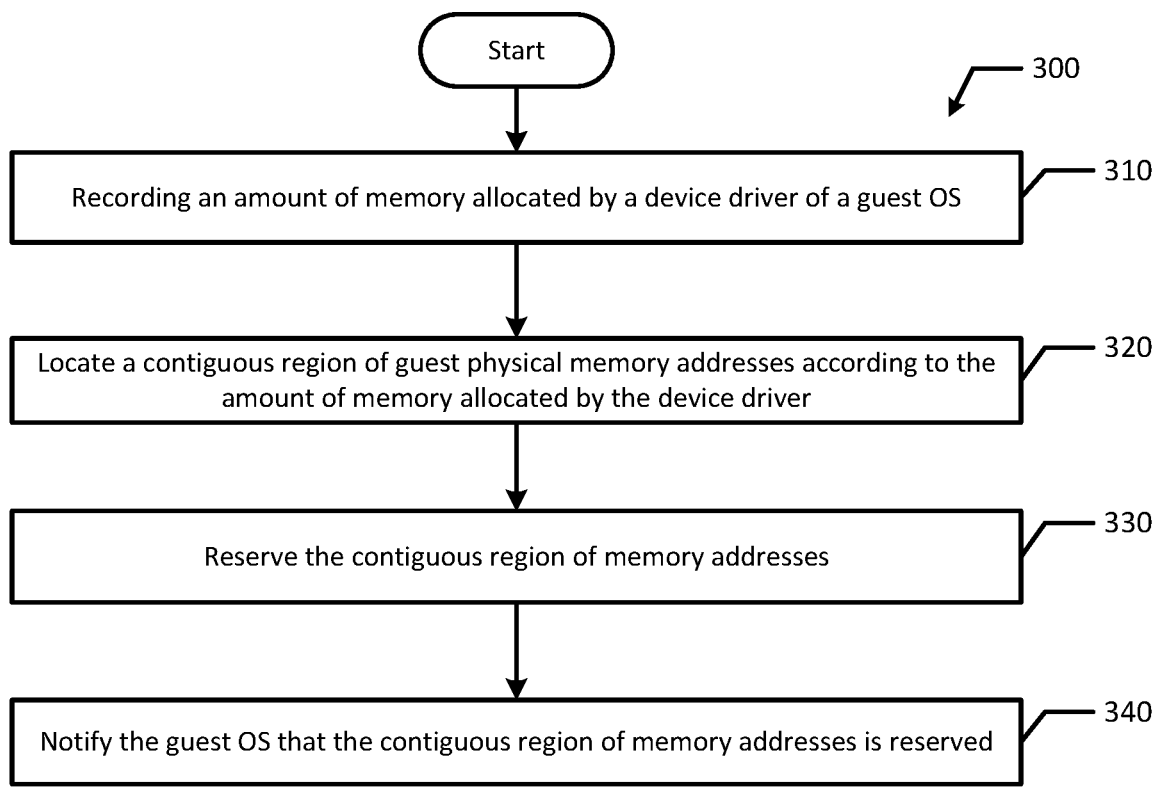
FIG. 3 illustrates a flowchart of an example process for resetting persistent balloon memory for fragmentation reduction according to an example embodiment of the present disclosure.

FIG. 3 illustrates a flowchart of an example method 300 for resetting persistent balloon memory for fragmentation reduction according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes recording an amount of memory allocated by a device driver of a guest OS (block 310). For example, after initialization, the hypervisor 180 may expose device memory to the guest OS, which is later allocated to the guest OS (e.g., guest OS 196C) via the device driver (e.g., device driver 188C. Any of guest OS 196A-C may be referred to generally as guest OS 196. Similarly, any of device driver 188A-C may be referred to generally as device driver 188. In the illustrated example, the hypervisor 180 may record an amount of usable ("deflated") device memory and unusable ("inflated") device memory. For example, the hypervisor 180 may record the amount of memory allocated to guest OS 196 as usable device memory from balloon device 197. In another example, the hypervisor 180 may record the amount of unusable device memory inflated in balloon device 197. Then, the hypervisor locates a contiguous region of guest physical memory addresses according to the amount of memory allocated by the device driver (block 320). For example, the hypervisor 180 may locate a contiguous region of memory (e.g., guest physical memory addresses) according to the amount of usable device memory (e.g., 3 GB of memory allocated by the device driver 188) from a balloon device 197 (e.g., balloon device 197C, hereinafter balloon device 197). Additionally, the hypervisor 180 may locate a contiguous region of guest physical memory addresses according to the amount of unusable device memory (e.g., 4 GB of memory inflated in the balloon device 197). The contiguous region(s) of memory may be identified by a respective start address and an end address in the memory region(s).

The hypervisor reserves the contiguous region of memory addresses (block 330). For example, the hypervisor 180 may reserve the located contiguous region(s) of memory (e.g., guest physical memory addresses) according to the amount of usable and unusable device memory, thereby compacting and defragmenting the region(s) of memory. In an example, the hypervisor 180 may also reserve contiguous regions of memory addresses on guest reset. For example, the hypervisor 180 may compact memory and reserve contiguous memory regions for the usable memory (e.g., usable device memory that is used by the guest OS). Additionally, the hypervisor 180 may reserve a contiguous region of memory for reserved memory or unusable device memory such that the guest OS 196 may operate on a contiguous region of usable memory and the balloon device 197 may be inflated with a contiguous region of unusable memory. In an example, initialization memory may be enough memory to initialize the guest OS 196 and/or virtual machine 170. In another example, the initialization memory may include some additional leftover memory beyond what is used for initialization. For example, the initialization memory may allow for a small application or task to start using the leftover initialization memory.

The hypervisor notifies the guest OS that the contiguous region of memory addresses is reserved (block 340). For example, the hypervisor 180 may notify the guest OS that the contiguous region(s) of device memory are reserved and handled by the balloon device driver 188. In an example, the hypervisor 180 may notify the guest OS that a start address through an end address (e.g., a contiguous region of memory addresses) is reserved for each respective region of memory. Additionally, the hypervisor 180 may notify the guest OS about usable device memory, such as balloon device memory that was previously used by guest OS 196 before restarting. In an example, the usable memory may be used by guest OS 196 of the virtual machine 170 to run additional applications (e.g., applications 198C-D) and execute tasks beyond the initialization tasks during startup. The usable memory may include the 3 GB of used memory. For example, referring back to FIG. 2, the device driver 188 inflated from 0 GB to 4 GB leaving 3 GB of usable balloon device memory and 4 GB of unusable device memory. Thus, the hypervisor 180 is advantageously able to force compaction and alignment of memory at guest reset to reduce fragmentation caused by device driver 188, which increases the guest OS's 196 and host OS's 186 ability to satisfy large page allocation requests at random times.

Figure 4A:
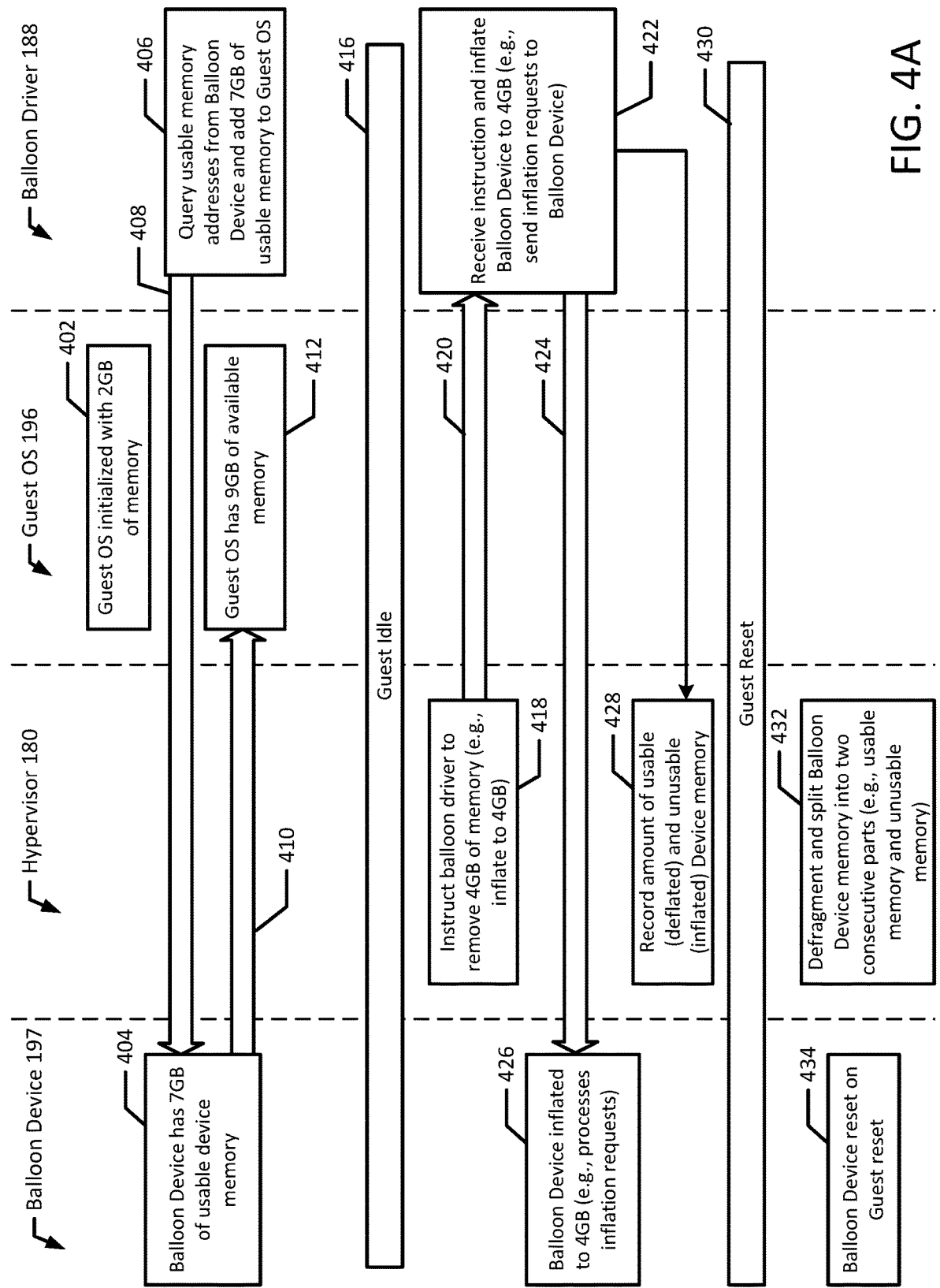
FIGS. 4A and 4B illustrate a flow diagram of an example process for resetting persistent balloon memory for fragmentation reduction according to an example embodiment of the present disclosure.
Figure 4B:
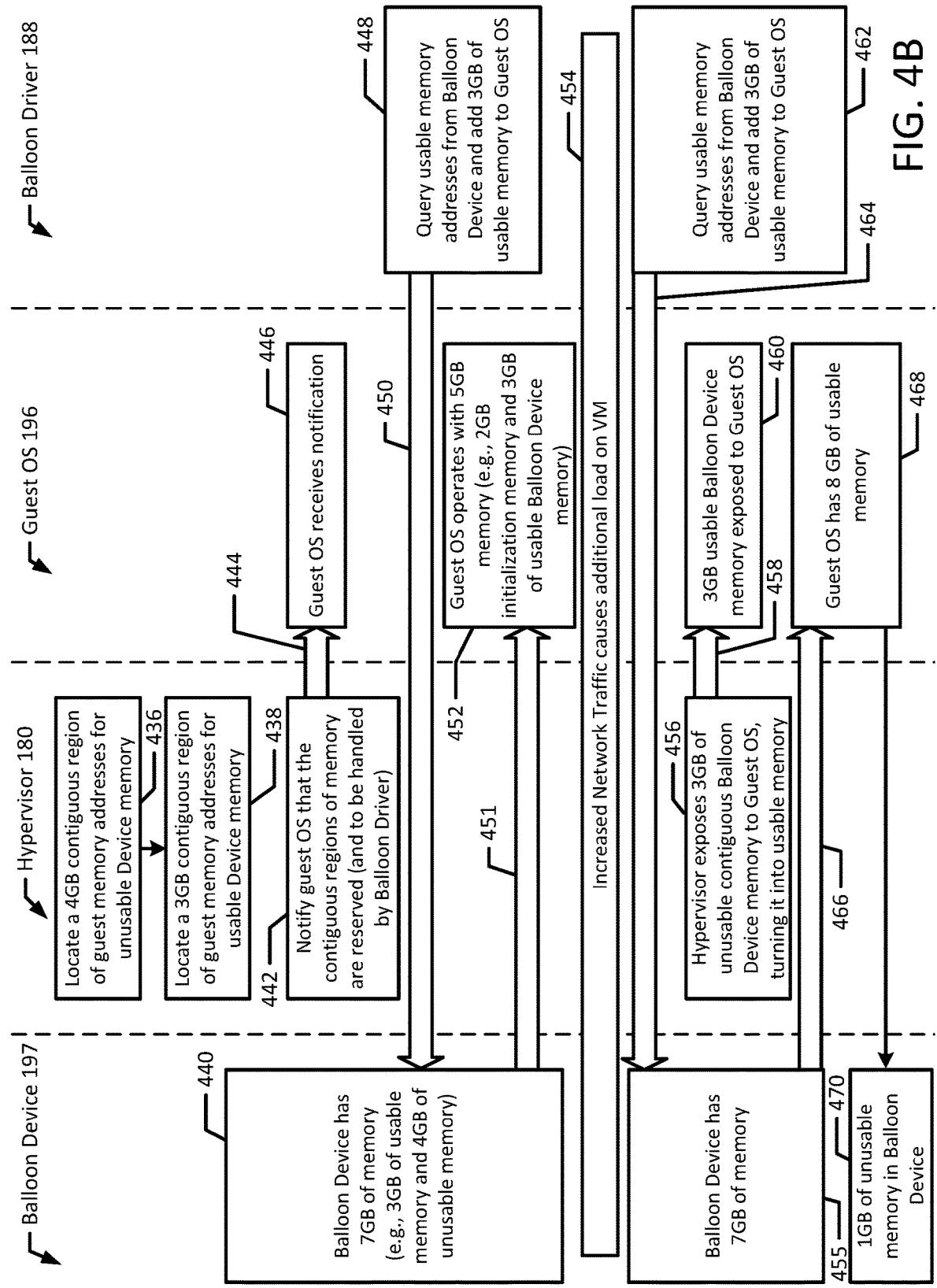

FIGS. 4A and 4B illustrate a flowchart of an example method 400 for resetting persistent balloon memory for fragmentation reduction in accordance with an example embodiment of the present disclosure. Although the example method 400 is described with reference to the flowchart illustrated in FIGS. 4A and 4B it will be appreciated that many other methods of performing the acts associated with the method 400 may be used. For example, the order of some of the blocks may be changed, certain blocks may be combined with other blocks, and some of the blocks described are optional. For example, a hypervisor 180 and guest OS 196 may communicate with a device driver 188 (e.g., balloon device driver) which controls a device (e.g., balloon device 197) to perform example method 400.

In the illustrated example, guest OS 196 is initialized with 2 GB of memory (block 402). For example, initialization memory may be exposed to the guest OS 196 by hypervisor 180. In an example, more than 2 GB of initialization memory may be exposed or made available to guest OS 196 for the guest OS 196 to initialize. It should be appreciated that the amount of initialization memory exposed to guest OS 196 may vary depending on various requirements of hardware, software, and/or environment of the virtual machine 170 associated with guest OS 196. In the illustrated example, balloon device 197 has 7 GB of usable device memory (block 404).

Then, the balloon device driver 188 may query the usable memory (e.g., memory addresses) from the balloon device 197 and add 7 GB of usable device memory to guest OS 196 (blocks 406, 408 and 410). The guest OS 196 has 9 GB of available memory (block 412). For example, after the 7 GB of balloon device memory is added to guest OS 196, the guest OS 196 has 9 GB of available memory (e.g., 2 GB of initialization memory and 7 GB of usable balloon device memory).

In the illustrated example, the guest OS 196 may become idle (block 416). For example, decreased network traffic may cause a reduced load on the virtual machine 170 and the guest OS 196 may become idle. In response to the guest OS becoming idle, the hypervisor 180 instructs the balloon device driver 188 to remove 4 GB of memory from the guest OS 196 (blocks 418 and 420). For example, the hypervisor 180 may send an instruction to the balloon device driver 188, such as an inflation request. Then the balloon device driver 188 receives the instruction and inflates the balloon device to 4 GB (blocks 422 and 424). For example, the balloon device driver 188 may receive the inflation request(s) from the hypervisor 180. The inflation request(s) may indicate an amount of memory or a specific range of memory (e.g., memory addresses) to remove from guest OS 196. Then, the balloon device 197 is inflated to 4 GB (block 426). For example, the balloon device 197 may receive and process the inflation request(s) to remove 4 GB of "usable" memory from guest OS 196.

In the illustrated example, the hypervisor 180 records an amount of usable (deflated) device memory and unusable (inflated) device memory (block 428). For example, the hypervisor 180 may record that the balloon device driver 188 inflated the balloon device 197 from 0 GB to 4 GB. Additionally, the hypervisor may record the amount of usable device memory currently used by guest OS 196.

Then, the guest OS 196 may reset (block 430). During reset, the hypervisor 180 defragments and splits balloon device memory into two consecutive parts (block 432). For example, the hypervisor 180 may split the balloon device memory into usable memory (e.g., memory that was used by guest OS 196 before reset that will be allocated to guest OS 196 after reset) and unusable memory (e.g., memory that was unused and inflated in balloon device 197). Upon guest reset, the balloon device 197 is reset (block 434). For example, the balloon device 197 may be a virtual device that is reset and reinitialized while the guest OS 196 reinitializes. To defragment the memory, the hypervisor locates a 4 GB contiguous region of guest memory addresses for the unusable device memory (block 436). Additionally, the hypervisor locates a 3 GB contiguous region of guest memory addresses for usable device memory (block 438). In an example, the hypervisor 180 may locate multiple contiguous regions of guest memory addresses for the usable memory. For example, the hypervisor may locate a contiguous region of 1 GB of memory and a contiguous region of 2 GB of memory for the 3 GB of usable memory. Multiple contiguous memory regions may advantageously allow a degree of defragmentation when larger contiguous regions of memory are unavailable. In an example, a contiguous region of guest memory addresses may be reserved from a start address and an end address in the memory region.

The balloon device has 7 GB of memory (block 440). For example, after reset, the balloon device 197 has 3 GB of device memory that will be made usable to the guest OS and 4 GB of unusable device memory. In an example, the hypervisor may expose 3 GB of reserved or unusable device memory, as discussed in more detail below.

Then, the hypervisor 180 notifies the guest OS 196 that the contiguous regions of memory are reserved (and to be handled by the balloon device driver 188) (blocks 442 and 444). For example, the hypervisor 180 may notify the guest OS 196 of reserved memory, which is handled by balloon device driver 188, thereby disabling the guest OS 196 from using the reserved memory. Then, the guest OS 196 receives the notification (block 446). In an example, the notification may be received via the device driver 188. For example, the device driver 188 may inform the guest OS which memory addresses it may use. The balloon driver queries usable memory addresses from balloon device 197 and adds 3 GB of usable device memory to guest OS 196 (blocks 448, 450, and 451). For example, the balloon driver 188 may add 3 GB worth of memory addresses for the guest OS 196 to use. After the addition of the 3 GB of usable device memory, the guest OS 196 operates with 5 GB of memory (block 452). For example, after startup and defragmentation, the guest OS operates with 2 GB of initialization memory and 3 GB of usable balloon device memory, which may be one or more contiguous regions of memory. In an example, the 2 GB of initialization memory and the 3 GB of usable balloon device memory may be a single 5 GB contiguous region of memory. Since the guest OS 196 operates on a contiguous memory region, applications may run more efficiently and tasks may be executed faster, and system performance may advantageously improve.

In the illustrated example, increased network traffic causes additional load on virtual machine 170 (block 454). For example, there may be increased use of applications 198, which places additional load on virtual machine 170. Balloon device still has 7 GB of memory (e.g., 3 GB of usable memory and 4 GB of unusable memory (block 455). In response to the increased load, the hypervisor 180 exposes 3 GB of unusable, contiguous balloon device memory to the guest OS 196, thereby turning the unusable device memory into usable device memory (blocks 456 and 458). For example, the hypervisor 180 may instruct the balloon device driver 188 to add 3 GB of memory to the guest OS 196 (e.g., consisting of large memory pages). Then, 3 GB of usable balloon device memory is exposed to guest OS 196 (block 460). The balloon driver queries usable memory addresses from balloon device 197 and adds 3 GB of usable device memory to guest OS 196 (blocks 462, 464, and 466). For example, the balloon driver 188 may add 3 GB worth of memory addresses for the guest OS 196 to use. The hypervisor 180 may send an instruction to the balloon device driver 188, such as a deflation request(s) before the balloon device driver 188 adds the usable device memory to guest OS 196. Then the balloon device driver 188 may receive and process the deflation request(s) from the hypervisor 180 to deflate the balloon from 4 GB to 1 GB. In an example, the deflation request(s) may indicate an amount of memory or a specific range of memory (e.g., memory addresses) to provide to guest OS 196.

Now, the guest OS 196 has 8 GB of usable memory (block 468). In an example, the memory may be compacted and allocated serially such that the guest OS 196 operates with 6 GB of contiguous device memory and 2 GB of initialization memory. Additionally, there is 1 GB of unusable memory reserved in the balloon device (block 470). In an example, the 1 GB of unusable memory in the balloon device 197 is a contiguous region of memory. For example, as discussed above, the balloon device 197 may inflate and/or deflate serially. It should be appreciated that there may be multiple cycles of compacting or defragmenting memory by the hypervisor 180 to continually defragment memory and optimize memory allocation.

Figure 5:
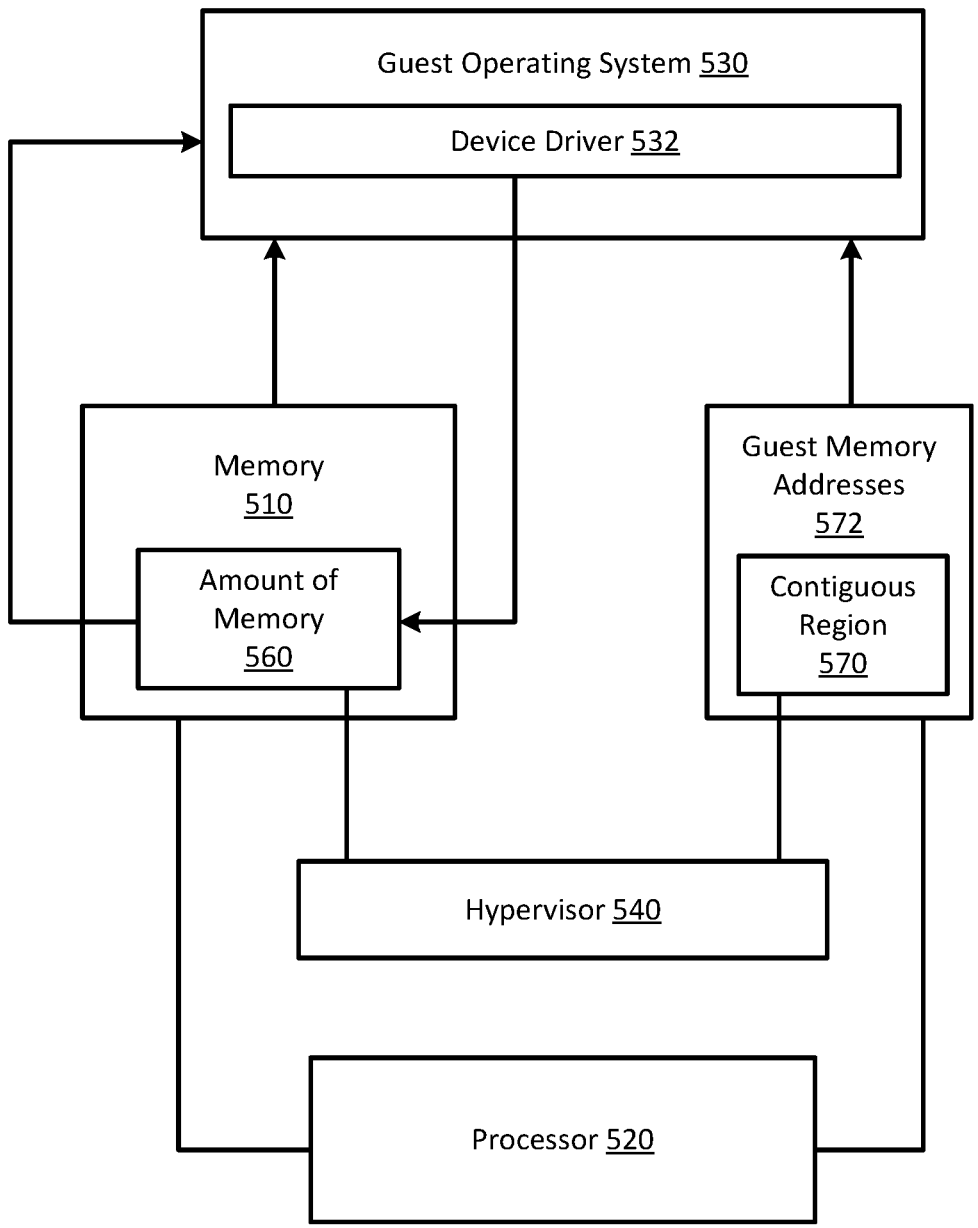
FIG. 5 illustrates a block diagram of an example balloon memory fragmentation reduction system according to an example embodiment of the present disclosure.

FIG. 5 is a block diagram of an example balloon memory fragmentation reduction system 500 according to an example embodiment of the present disclosure. The balloon memory fragmentation reduction system 500 includes a memory 510, at least one processor 520 in communication with the memory 510, a guest operating system 530 including a device driver 532, and a hypervisor 540 executing on the at least one processor 520. The hypervisor 540 is configured to record an amount of memory 560 allocated by the device driver 532 of the guest OS 530, locate a contiguous region 570 of guest memory addresses 572 according to the amount of memory 560 allocated by the device driver 532, reserve the contiguous region 570 of guest memory addresses 572, and notify the guest OS 530 that the contiguous region 570 of guest memory addresses 572 is reserved.

Instead of the guest OS 530 resetting with fragmented memory, the hypervisor 540 compacts memory by locating contiguous regions(s) 570 of guest memory addresses 572. Thus, the reserved memory in the balloon device is a contiguous region of memory, which may be allocated to the guest OS 530 serially, which advantageously reduces memory fragmentation and enables the guest OS 530 to satisfy large page allocation requests in a virtual machine memory overcommit system.

The systems and methods disclosed herein are inextricably tied to and provide improvements to computer technology. For example, by recording the amount of usable device memory allocated by the balloon device driver (and optionally the unusable device memory inflated in the balloon device) and compacting the memory on guest reset, the hypervisor defragments regions of guest memory (e.g., balloon device memory) while ensuring the guest OS is able to run properly after the guest OS resets. Thus, fragmentation that is caused by giving the balloon device driver control over balloon device memory is reduced without limiting control the balloon device driver has on balloon device memory. For example, allowing the balloon device driver to add and remove memory (e.g., inflate and deflate a balloon device) may cause ballooned memory pages to be scattered in guest memory. Because the balloon device driver typically determines how much memory can be inflated in a balloon device without causing the guest OS to crash, the host cannot combine the scattered pages to free a larger page. The solution described herein is necessarily rooted in computer technology to overcome a problem specifically arising in the realm of computer hardware virtualization, and more specifically to memory overcommit, by addressing the challenge of defragmenting memory that is allocated for virtual machine memory overcommit. For example, the hypervisor 180 records the amount of usable device memory allocated by the balloon device driver 188 (and optionally the amount of unusable device memory), and at guest reset, compacts memory by locating a contiguous region(s) of memory according to the amount of usable device memory allocated by the balloon device driver 188 and/or the amount of unusable device memory inflated in the balloon device. The hypervisor 180 reserves the respective region(s) of memory and notifies the guest OS 196 about the reserved contiguous region(s) of memory (e.g., usable and unusable device memory). After the guest OS 196 initializes, the guest OS 196 avoids using the reserved or unusable region(s) of device memory because they are handled by the balloon device driver 188. Additionally, the device driver 188 enables the guest OS 196 to use the usable device memory, and the usable device memory is reserved until the device driver 188 adds the memory to guest OS 196. By noting the amount of memory allocated by the balloon device driver 188, the hypervisor advantageously resets the guest OS 196 with enough memory to initialize and resume its tasks while defragmenting unused memory, which advantageously improves system performance and speed after guest reset. The described system and methods allow the hypervisor 180 to compact and defragment virtual machine memory while enabling a device driver to control specific memory requests to ensure that the guest OS 196 can handle memory requests without losing stability or killing applications, which prevents the guest OS 196 from crashing and reduces the amount of memory fragmentation caused by the device driver adding and removing memory from balloon device 197, thereby improving system performance, hardware utilization, and virtual machine density not previously performable.

By allowing the hypervisor 180 to compact memory upon guest reset while limiting the control the hypervisor has on balloon device memory, the systems and methods disclosed herein offer the benefit of efficiently allocating memory and reducing memory fragmentation caused by the guest OS 196 to provide balloon memory fragmentation reduction for a virtual machine memory overcommit system, which is a technology-based solution that overcomes the disadvantages of allocating memory according to generic and conventional methods. The hypervisor 180 executing on a processor (e.g., CPU 120) acts in concert with guest OS 196, device driver 188, and balloon device 197 to provide a non-conventional and non-generic arrangement that improve existing virtual machine memory overcommit techniques to reduce balloon memory fragmentation while reducing the likelihood of the guest OS 196 from crashing and improving system performance. Thus, system performance, hardware utilization, and virtual machine density is improved for virtual machine memory overcommit systems.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory;
a guest operating system (OS) including a device driver; and
a hypervisor executing on the processor, wherein the hypervisor is configured to:
responsive to a guest reset which occurs after guest memory used by the device driver is fragmented, locate a contiguous region of guest memory addresses according to an amount of memory currently allocated by the device driver, wherein the contiguous region includes at least two memory pages,
compact the memory currently allocated by the device driver,
reserve the contiguous region of guest memory addresses for a future allocation by the device driver, and
notify the guest OS that the contiguous region of guest memory addresses is reserved.

2. The system of claim 1, wherein the hypervisor is further configured to locate a second contiguous region of guest memory addresses.

3. The system of claim 2, wherein the contiguous region of guest memory addresses and the second contiguous region of guest memory addresses are reserved, wherein multiple scattered memory pages are compacted, the multiple scattered memory pages having the same size of at least one of the contiguous region of guest memory addresses and the second contiguous region of guest memory addresses.

4. The system of claim 2, wherein the second contiguous region of guest memory addresses is associated with the usable memory.

5. The system of claim 1, wherein the guest OS is disabled from using the contiguous region of memory as the guest OS initializes.

6. The system of claim 1, wherein the hypervisor is further configured to expose a balloon device to the guest OS, and the contiguous region of memory is associated with the balloon device.

7. The system of claim 6, wherein the balloon device is associated with a non-uniform memory access node.

8. The system of claim 6, wherein the hypervisor is further configured to:
expose a second balloon device to the guest OS,
locate a second contiguous region of guest memory addresses according to the amount of memory allocated by the device driver,
reserve the contiguous region of memory addresses for the balloon device to replace the memory currently allocated by the device driver,
reserve a the second contiguous region of memory addresses for the second balloon device, and
notify the guest OS that the second contiguous region of memory addresses is reserved.

9. The system of claim 8, wherein the guest OS is disabled from using the second contiguous region of memory addresses.

10. A method comprising:
responsive to a guest reset which occurs after guest memory used by a device driver is fragmented, locating, by a hypervisor, a contiguous region of guest memory addresses according to an amount of memory currently allocated by the device driver, wherein the contiguous region includes at least two memory pages;
compacting the memory currently allocated by the device driver;
reserving, by the hypervisor, the contiguous region of memory addresses for a future allocation by the device driver; and
notifying, by the hypervisor, the guest OS that the contiguous region of memory addresses is reserved.

11. The method of claim 10, further comprising locating a second contiguous region of guest memory addresses.

12. The method of claim 11, further comprising disabling, by the hypervisor, the guest OS from using the contiguous region of guest memory addresses and the second region of guest memory addresses as the guest OS initializes.

13. The method of claim 11, further comprising:
disabling, by the hypervisor, the guest OS from using the contiguous region of guest memory addresses as the guest OS initializes; and
exposing, by the hypervisor, the second contiguous region of guest memory addresses as the usable memory as the guest OS initializes.

14. The method of claim 10, further comprising:
disabling, by the hypervisor, the guest OS from using the contiguous region of guest memory addresses as the guest OS initializes.

15. The method of claim 10, further comprising:
exposing, by the hypervisor, a balloon device to the guest OS, wherein the contiguous region of guest memory addresses is associated with the balloon device.

16. The method of claim 15, wherein the balloon device is associated with a non-uniform memory access node.

17. The method of claim 15, further comprising:
exposing, by the hypervisor, a second balloon device to the guest OS;
locating, by the hypervisor, a second contiguous region of guest memory addresses according to the amount of memory allocated by the device driver;
reserving, by the hypervisor, the contiguous region of memory addresses for the balloon device;
reserving, by the hypervisor, a second contiguous region of memory addresses for the second balloon device to replace the memory currently allocated by the device driver; and
notifying, by the hypervisor, the guest OS that the second contiguous region of memory addresses is reserved.

18. The method of claim 17, further comprising disabling, by hypervisor, the guest OS from using second contiguous memory addresses.

19. A non-transitory machine readable medium storing code, which when executed by a processor, is configured to:

responsive to a guest reset which occurs after guest memory used by a device driver is fragmented, locate a contiguous region of guest memory addresses according to an amount of memory currently allocated by the device driver, wherein the contiguous region includes at least two memory pages;

compact the memory currently allocated by the device driver for a future allocation by the device driver;

reserve the contiguous region of memory addresses; and notify the guest OS that the contiguous region of memory addresses is reserved.

20. The non-transitory machine readable of claim 19, further configured to:

expose a second balloon device to the guest OS;

locate a second contiguous region of guest memory addresses according to the amount of memory allocated by the device driver;

reserve the contiguous region of memory addresses for the balloon device;

reserve a second contiguous region of memory addresses for the second balloon device to replace the memory currently allocated by the device driver; and notify the guest OS that the second contiguous region of memory addresses is reserved.

* * * * *